(12) United States Patent
Marlow

(10) Patent No.: US 9,479,343 B2
(45) Date of Patent: Oct. 25, 2016

(54) ENGINE FOR PROCESSING CONTENT RULES ASSOCIATED WITH LOCATIONS IN A PAGE

(71) Applicant: Excalibur IP, LLC, Sunnyvale, CA (US)

(72) Inventor: Keith Anthony Marlow, Galston (AU)

(73) Assignee: Excalibur, IP, LLC, Sunnyvale, CA (US)

( * ) Notice: Subject to any disclaimer, the term of this patent is extended or adjusted under 35 U.S.C. 154(b) by 0 days.

(21) Appl. No.: 14/929,651

(22) Filed: Nov. 2, 2015

(65) Prior Publication Data

US 2016/0119155 A1    Apr. 28, 2016

Related U.S. Application Data

(63) Continuation of application No. 11/537,444, filed on Sep. 29, 2006, now Pat. No. 9,178,793.

(51) Int. Cl.

| H04L 12/16 | (2006.01) |
|---|---|
| H04W 4/02 | (2009.01) |
| H04L 12/26 | (2006.01) |
| G06Q 10/10 | (2012.01) |
| H04L 12/18 | (2006.01) |
| G06Q 10/06 | (2012.01) |
| H04L 29/08 | (2006.01) |
| H04L 29/12 | (2006.01) |
| H04L 29/06 | (2006.01) |

(52) U.S. Cl.
CPC ............ *H04L 12/16* (2013.01); *G06Q 10/06* (2013.01); *G06Q 10/10* (2013.01); *G06Q 10/105* (2013.01); *H04L 12/1822* (2013.01); *H04L 43/50* (2013.01); *H04L 61/2557* (2013.01); *H04L 63/0227* (2013.01); *H04L 67/00* (2013.01); *H04W 4/02* (2013.01)

(58) Field of Classification Search
None
See application file for complete search history.

(56) References Cited

U.S. PATENT DOCUMENTS

| 5,978,768 A * | 11/1999 | McGovern ......... G06Q 10/1053 705/321 |
|---|---|---|
| 6,385,620 B1 * | 5/2002 | Kurzius ................ G06Q 10/10 |
| 6,466,914 B2 * | 10/2002 | Mitsuoka ....... G06Q 10/063112 705/37 |
| 6,560,633 B1 * | 5/2003 | Roberts .................... G06F 8/35 707/999.002 |
| 6,728,767 B1 * | 4/2004 | Day ................. H04L 29/12066 709/223 |
| 6,871,244 B1 * | 3/2005 | Cahill ................. G06F 13/4068 710/105 |
| 6,892,178 B1 * | 5/2005 | Zacharia ............... G06Q 10/04 705/7.29 |
| 6,920,488 B1 * | 7/2005 | Le Pennec ........ G06F 17/30905 707/E17.121 |

(Continued)

*Primary Examiner* — Ninos Donabed
(74) *Attorney, Agent, or Firm* — James J. DeCarlo; Greenberg Traurig LLP

(57) ABSTRACT

A device, system, and method are directed towards enabling a network application to process and respond to requests from client devices. A rules engine receives a page, evaluates a set of rules, and performs actions based on the rules. Actions may modify the page or perform other actions affecting the environment. A rules engine may also process rules prior to processing pages, in order to optimize subsequent evaluation of the rules.

18 Claims, 10 Drawing Sheets

(56) References Cited

U.S. PATENT DOCUMENTS

| | | | | |
|---|---|---|---|---|
| 7,203,901 B2 * | 4/2007 | Chen | G06F 17/30905 | 345/419 |
| 7,454,530 B2 * | 11/2008 | Cahill | G06F 13/102 | 710/11 |
| 7,512,577 B2 * | 3/2009 | Slemmer | G05B 13/028 | 706/47 |
| 7,725,405 B2 * | 5/2010 | Johnson | G06Q 10/10 | 705/1.1 |
| 7,873,901 B2 * | 1/2011 | Chen | G06F 17/30905 | 715/234 |
| 8,020,090 B2 * | 9/2011 | Chen | G06F 17/30905 | 715/204 |
| 8,028,093 B2 * | 9/2011 | Karaoguz | H04H 60/80 | 709/246 |
| 8,275,863 B2 * | 9/2012 | Selgas | H04L 29/06 | 709/221 |
| 8,495,180 B2 * | 7/2013 | Karaoguz | H04L 12/2803 | 709/218 |
| 2001/0047294 A1 * | 11/2001 | Rothschild | G06Q 30/02 | 705/14.47 |
| 2001/0054001 A1 * | 12/2001 | Robinson | G06Q 30/02 | 705/14.53 |
| 2002/0004733 A1 * | 1/2002 | Addante | G06Q 30/02 | 705/14.51 |
| 2002/0010757 A1 * | 1/2002 | Granik | G06F 17/30876 | 709/218 |
| 2002/0026452 A1 * | 2/2002 | Baumgarten | G06Q 10/10 | |
| 2002/0032677 A1 * | 3/2002 | Morgenthaler | G06F 17/30781 | |
| 2002/0038344 A1 * | 3/2002 | Ullman | G06F 17/30855 | 709/203 |
| 2002/0069105 A1 * | 6/2002 | do Rosario Botelho | G06F 17/30867 | 705/14.53 |
| 2002/0080927 A1 * | 6/2002 | Uppaluru | H04M 3/4938 | 379/88.01 |
| 2004/0148341 A1 * | 7/2004 | Cotte | H04L 29/06027 | 709/203 |
| 2005/0015525 A1 * | 1/2005 | Cahill | G06F 13/4068 | 710/62 |
| 2006/0282444 A1 * | 12/2006 | Chen | G06F 17/30905 | |
| 2006/0282445 A1 * | 12/2006 | Chen | G06F 17/30905 | |
| 2009/0070209 A1 * | 3/2009 | Von Wolfsheild | G06Q 30/0241 | 705/14.4 |

* cited by examiner

ENGINE FOR PROCESSING CONTENT RULES ASSOCIATED WITH LOCATIONS IN A PAGE

CROSS REFERENCE TO RELATED APPLICATIONS

This application is a continuation of and claims priority from co-pending U.S. patent application Ser. No. 11/537,444, filed Sep. 29, 2006, entitled ENGINE FOR PROCESSING CONTENT RULES ASSOCIATED WITH LOCATIONS IN A PAGE, which is hereby incorporated by reference.

FIELD OF THE INVENTION

The present invention relates generally to network communications and, more particularly, but not exclusively to facilitating communication between network applications and client devices.

BACKGROUND OF THE INVENTION

The global wireless market has been experiencing tremendous growth over recent years. This growth includes an increased demand for data services, such as Internet browsing, text messaging, multi-media messaging, and email. There also has been a proliferation of types and models of wireless devices.

Client devices differ from each other in a number of ways, including screen size, color capabilities, communication protocols, character sets, markup languages, and input mechanisms. Network carriers may also employ differing communication protocols or have other specifications that impact communication. Data services, such as web sites, email providers, and others are faced with tasks of handling these differences. Network application developers may find it useful to have systems and methods that facilitate communication with client devices, while aiding in the tasks related to handling the variety of client devices and network carriers.

The generation of pages, such as web pages or application pages, for delivery to client devices, may involve a high degree of complexity. A page may be changed in a number of ways prior to delivery to client devices. These include such changes as inserting an advertisement, altering a page header, updating text or graphic content, or otherwise changing the content or layout of a page. The process of making changes, tracking the changes, and verifying correctness of updates may require a large investment of time. The process is also prone to errors. It is desirable to have efficient mechanisms for managing these processes, and reducing errors. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION OF THE INVENTION

Figure 1:
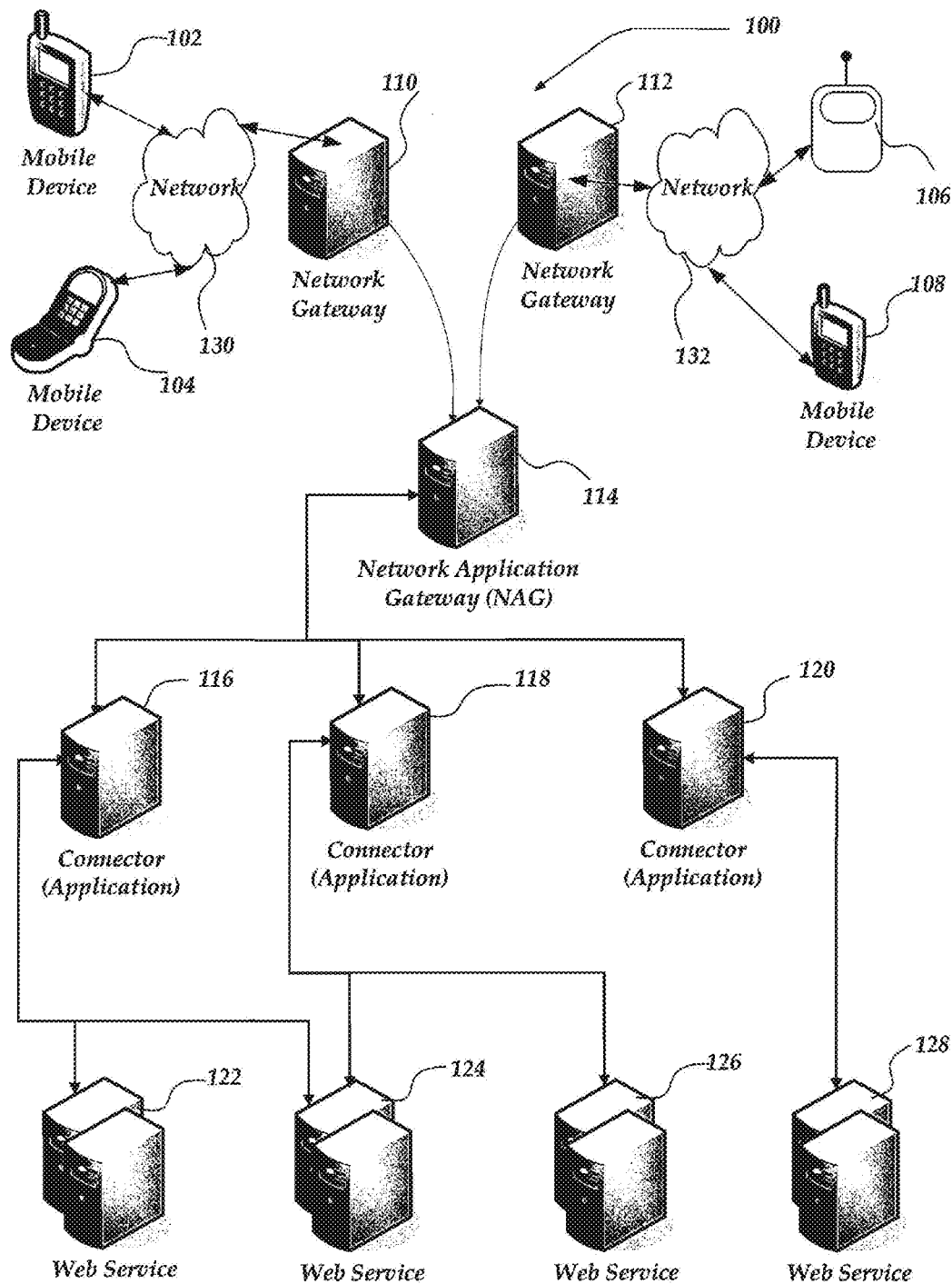
FIG. 1 is a system diagram of one embodiment of an environment in which the invention may be practiced.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "receiving" an item, such as a request, response, or other message, from a device or component includes receiving the message indirectly, such as when forwarded by one or more other devices or components. Similarly, "sending" an item to a device or component includes sending the item indirectly, such as when forwarded by one or more other devices or components.

As used herein, the term "mobile identification number" (MIN) refers to a number that uniquely identifies a mobile device within a mobile carrier's network. A cellular telephone's phone number may be used as an MIN.

As used herein, the term "client application" refers to an application that runs on a client device. A client application may be written in one or more of a variety of languages, such as 'C', 'C++', 'J2ME', 'Brew', Java, and the like. Browsers, email clients, text messaging clients, calendars, and games are examples of client applications.

As used herein, the term "network application" refers to a computer-based application that communicates, directly or indirectly, with at least one other component across a network. Web sites, email servers, messaging servers, and game servers are examples of network applications.

As used herein, the term "uniform resource identifier" (URI) refers to an identifier used to identify an abstract or physical resource. The term URI includes uniform resource locators (URL) and uniform resource names (URN). Request for Comments (RFC) 3986, a copy of which can be found at http://www.ietf.org/rfc/rfc3986.txt?number=3986, describes a syntax for a URI. As used herein, the term URI is not limited to this syntax, and may include other syntaxes.

Briefly stated the present invention is directed towards enabling network applications to process and respond to requests from client devices. The system and methods of the invention centralize portal business logic, enabling network applications to focus more on the application-specific logic, with less of the complexity required when responding to heterogeneous portals, client devices, carriers, and the like. The system and methods of the invention facilitate the extraction of data from a request, the determination of data that is desirable to process the request, and the retrieval of various types of data associated with the request, including data associated with the client device and associated network carrier. The system and methods of the invention further facilitate the determination of data that is desirable in order to generate a response to the request, and the retrieval of various types of data to be used in generating the response and communicating the response to a client device. The system and methods of the invention further provide a network application with a mechanism for generating a response which is not necessarily tailored to the specifications and capabilities of the client device or its associated network gateway, while providing a mechanism for enhancing the response for the client device or network gateway.

The present invention includes the use of configuration data related to attributes of a variety of client devices and network carriers and methods of storing and retrieving the configuration data. It also includes the storage and retrieval of data associated with each client device, including information that may be included in HTTP cookies.

The present invention facilitates session management, enabling a network application to process multiple requests or communications with a client device or user. It enables network applications to employ cookies associated with sessions with a variety of client devices, including client devices that may not support cookies or may not provide unique identifying information.

The present invention enables an Internet application to retrieve data that is to be used for processing a request from a client device. The system may maintain and use some data without providing it to the network application. The system processes requests prior to forwarding them to the appropriate network application, and processes responses generated by the Internet application, prior to forwarding the responses to the client device. In this way, the system reduces a portion of the work that is to be performed by the application during the request processing, including processing that is particular to a subset of client devices or network carriers. In this way, a network application is enabled to implement the features of the application and reduce the complexity of its processes as relating to the heterogeneous technology of client devices and network carriers. Generally, the system manages client device attributes and capabilities that may not be in common across all client devices, and processes responses based on this information.

One aspect of the present invention is directed towards facilitating the specification of content that is to be sent to a client device, as well as the layout, formatting, and other parameters that prepare a page for delivery. The system and methods of the invention further facilitate the specification, maintenance, and execution of logic that controls manipulation and transformation of content. The system and methods of the invention further provide a mechanism for testing the specifications prior to installation and use in its intended environment.

One aspect of the present invention includes the specification and use of a set of rules describing the content, layout, and logic that is to be employed in the generation of pages. The logic facilitates selective manipulation of content based on a number of criteria selected from the environment, including the destination of the content. This allows the accommodation of differing specifications of client devices, differing classes of users, and a number of other ways in which content may be customized. It further provides a mechanism in which transformations can be tracked, reversed, or selectively performed based on a number of criteria.

One aspect of the invention includes a rule engine that performs tests of an environment based on a set of rules. When a rule match is found, an action specified by the rule is performed. The action may specify a portion of data to be inserted on to a page. The data may specify content, layout parameters, or other specifications. The rule engine may be employed to selectively transform a page in a number of ways, or to selectively perform actions that modify the environment.

In one aspect of the invention, prior to executing the rule engine, an offline process is performed to prepare the rule set and to optimize the rule execution process. A rules collator and rules optimizer are employed to retrieve, parse, validate, and optimize a set of rules, and to compile them into an efficient, computer-readable code. A resultant set of instructions represents the desired rules, and is used by the rule engine as described above.

One aspect of the invention enables network application developers, advertisers, and content providers to deliver content and reduce the complexity of its processes as relating to the heterogeneous technology of client devices, network carriers, the business logic required by advertisers and third party vendors.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes client devices, in particular mobile devices 102-108, networks 130-132, network gateways 110-112, network application gatewaynetwork application gateway 114, connectors 116-120, and web services 122-128.

One embodiment of mobile devices 102-108 is described in more detail below in conjunction with FIG. 2. Generally, however, mobile devices 102-108 may include virtually any portable computing device capable of receiving and sending a message over a network, such as networks 110-112, or the like. Mobile devices 102-108 may also be described generally as client devices that are configured to be portable. Mobile devices 102-108 may have the capability of connecting to a network using wireless technology, wired connections, or a combination of both wired and wireless connections. Thus, mobile devices 102-108 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, digital home set-top devices, integrated devices combining one or more of the preceding devices, and the like. As such, mobile devices 102-108 typically range widely in terms of capabilities and features. For example, a cell phone may have a numeric keypad and a few lines of monochrome LCD display on which only text may be displayed. In another example, another cell phone or web-enabled mobile device may have a touch sensitive screen, a stylus, and several lines of color LCD display in which both text and graphics may be displayed.

A web-enabled client device may include a browser application that is configured to receive and to send web pages, web-based messages, and the like. The browser application may be configured to receive and display graphics, text, video, multimedia, and the like, employing virtually any web based language or protocol, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-108 may include one or more other client applications that are configured to receive content from another computing device. The client application may include a capability to provide and receive textual content, graphical content, audio content, video content, and the like. The client application may further provide information that identifies itself, including a type, capability, name, and the like. In one embodiment, mobile devices 102-108 may uniquely identify themselves through any of a variety of mechanisms, including a phone number, Mobile Identification Number (MIN), an electronic serial number (ESN), or other mobile device identifier. In one embodiment, a mobile device may store and send cookies with identifying data that may identify the device or device user. The information may also indicate a content format that the mobile device is enabled to employ. Such information may be provided in a message, or the like, sent to network application gatewaynetwork application gateway 114, connectors 116-120, or other computing devices.

Mobile devices 102-108 may also be configured to communicate a message, such as through Short Message Service (SMS), Multimedia Message Service (MMS), instant messaging (IM), internet relay chat (IRC), Mardam-Bey's IRC (mIRC), Jabber, and the like, between another computing device, such as network application gatewaynetwork application gateway 114, connectors 116-120, or the like. However, the present invention is not limited to these message protocols, and virtually any other message protocol may be employed.

Mobile devices 102-108 may be further configured to enable a user to participate in communications sessions, such as IM sessions. As such, mobile devices 102-108 may include a client application that is configured to manage various actions on behalf of the client device. For example, the client application may enable a user to interact with the browser application, email application, IM applications, SMS application, and the like.

Mobile devices 102-108 may further be configured to include a client application that enables the end-user to log into an end-user account that may be managed by a network application, such as connectors 116-120. Such end-user account, for example, may be configured to enable the end-user to receive emails, send/receive IM messages, SMS messages, access selected web pages, participate in a social networking activity, or the like.

Networks 130-132 are configured to couple mobile devices 102-104 and 106-108, respectively and its components with network gateways 110-112, respectively. Networks 130-132 may include any of a variety of wireless sub-networks that may further overlay stand-alone ad-hoc networks, and the like, to provide an infrastructure-oriented connection for mobile devices 102-108. Such sub-networks may include mesh networks, Wireless LAN (WLAN) networks, cellular networks, and the like. Additionally, networks 130-132 may connect to mobile devices with a wired connection, such as cable, phone lines, Ethernet wires, and the like. The invention may be used either generally with networks, specifically with wireless networks, or with various combinations of wireless and wired networks. Networks 130 and 132 may be completely distinct from each other, may share components, or may be the same network.

Networks 130-132 may further include an autonomous system of terminals, gateways, routers, and the like connected by wireless radio links, and the like. These connectors may be configured to move freely and randomly and organize themselves arbitrarily, such that the topology of networks 130-132 may change rapidly.

Networks 130-132 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-108 with various degrees of mobility. For example, networks 130-132 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, networks 130-132 may include virtually any communication mechanism by which information may travel between mobile device s 102-108 and another computing device, network, and the like.

Network gateways 110-112 are computing devices that serve as intermediaries between client devices 102-108 and other network devices, such as network application gatewaynetwork application gateway 114, and connectors 116-120. A network gateway 110-112 may be owned or maintained by a network carrier, such as a wireless carrier, and be associated with the network carrier. Network gateway 110-

112 may reside within a network carrier's network, or may be external to the network. A network gateway may receive data from a device or network, transform the data, and forward the data to another device or network. A network gateway may perform a transformation in more than one direction. Transformation may, for example, include modifying protocols or communications mechanisms in order to facilitate communication between two devices or two networks, each of which may employ differing protocols. A WAP gateway is one type of network gateway. A WAP gateway may facilitate communication between a first device that uses the Wireless Application Protocol (WAP), and a second device. The second device may, for example, communicate using the HyperText Transfer Protocol (HTTP). An SMS gateway is a network gateway that facilitates communication between a device using the Short Message Service (SMS) protocol and another device, such as one using HTTP. A WAP and SMS gateway combines the features of a WAP gateway and an SMS gateway. Network gateways 110-112 may include a WAP gateway, an SMS gateway, or other types of network gateways or combinations thereof.

Network gateways 110-112 may have different functionality or different attributes from each other. For example, each may use a different protocol, including a different version of a protocol, from the other. Each network gateway may have different software, different software versions, or different hardware that results in differences in communications or functionality. For example, one network gateway may have a version of software that has a particular bug in it, while the other may have a newer version without the bug, whereas the bug may cause differences in communications. Network gateways may also differ in their security features, such that one filters out or modifies a communication while another one allows a similar communication to be forwarded without the modification.

FIG. 1 shows network gateways 110 and 112 communicating with network application gatewaynetwork application gateway 114, network application gatewaynetwork application gateway communicating with each of connectors 116-120, and connectors 116-120 each communicating with one or more of web services 122-128. Each of these communications may employ a direct connection, or one or more networks, or a combination thereof.

A network enabling any one or more of the above communications may employ any form of computer readable media for communicating information from one electronic device to another. Also, the network can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, the network includes any communication method by which information may travel between network gateways 110-112, network application gateway 114, connectors 116-120, web services 122-128, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of network application gateway 114 is described in more detail below in conjunction with FIG. 3. Briefly, however, network application gateway 114 may include any computing device capable of connecting to one or both of network gateways 110-112, as well as additional network gateways, to enable network applications or web sites to process and respond to requests from client devices.

Devices that may operate as network application gateway 114 include personal computers desktop computers, multi-processor systems, microprocessor-based or programmable consumer electronics, network PCs, servers, and the like, or any combination thereof.

Although FIG. 1 illustrates network application gateway 114 as a single computing device, the invention is not so limited. For example, one or more functions of network application gateway 114 may be distributed across one or more distinct computing devices. For example, receiving requests, extracting information from requests, retrieving data associated with requests or with client devices and network gateways, sending requests and associated data to connectors, receiving responses, processing, enhancing, and formatting responses, and sending responses to requesting devices, or the like, may be performed by a plurality of computing devices, without departing from the scope or spirit of the present invention.

As illustrated in FIG. 1, network application gateway 114 communicates with one or more connectors 116-120. Connectors are network applications that may include business logic and presentation logic. This logic may include decisions on how to respond to a request, what information to present in a response, and how to present the information. The presentation decisions may include decisions as to how a response page may appear, or where on a page information may appear. Connectors communicate with other computing devices, such as mobile devices 102-108. As discussed in further detail below, connectors 116-120 may receive requests, process the requests, and respond to the requests. The requests may include requests for information, requests to perform an action, requests to store or retrieve data, requests to communicate with other computing devices, and the like, or combinations thereof. In response to requests, connectors 116-120 may communicate with other data storage devices or computing devices, such as web services 122-128.

Connectors 116-120 may include any computing device capable of communicating with other computing devices and performing the functions described herein. Connectors 116-120 may include software programmed to facilitate these functions. A connector may be considered to be a computing device, software residing on a computing device, or a combination thereof. A computing device may include one or more connectors. A connector may include one or more computing devices.

Web services 122-128 represents a variety of services that may provide information or perform actions in response to requests from client devices. Such services include, but are not limited to information services, third-party services, audio services, video services, email services, IM services, SMS services, VOIP services, calendaring services, photo services, or the like. These services may provide a variety of content, such as news, stock data, web postings, and the like. The services may also provide individualized services such as banking, financial management, educational services, shopping, and the like. Devices that may operate as web services 122-128 include personal computers desktop computers, multiprocessor systems, microprocessor-based or programmable consumer electronics, network PCs, servers, and the like. A web service may be in a single location, or geographically distributed. A single computing system may provide one or more web services, and a web service may employ one or more computing systems.

Illustrative Mobile Client Environment

Figure 2:
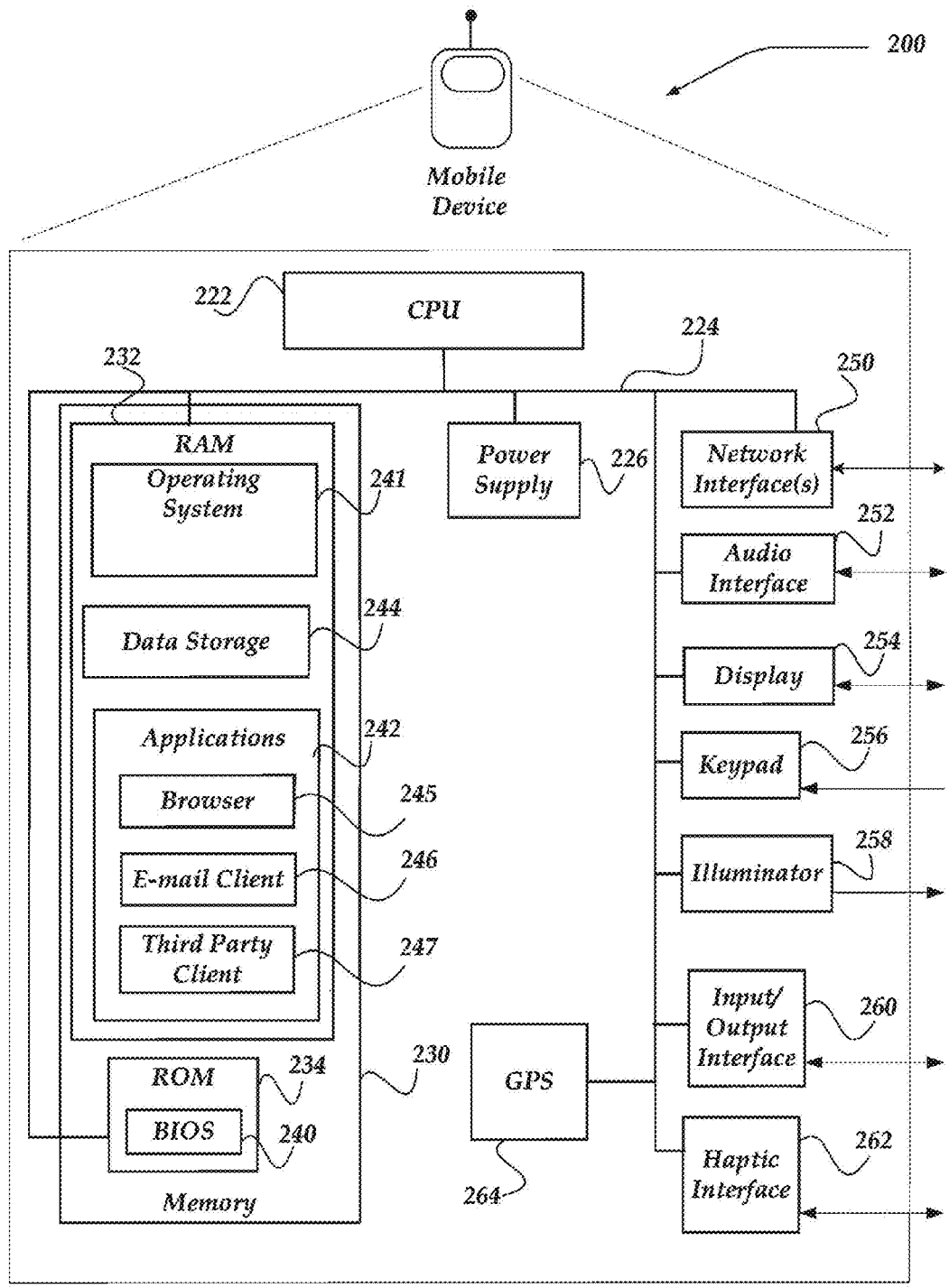
FIG. 2 shows one embodiment of a mobile device that may communicate with a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, mobile devices 102-108 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, mobile device may, through other components, provide other information that may be employed to determine a physical location of the device, including for example, a MAC address, IP address, or the like.

Mass memory 230 includes a RAM 232, a ROM 234, and other storage means. Memory 230 may include a volatile memory, a non-volatile memory such as flash memory, or both. Memory 230 may include a non-volatile memory that is easily removable by a user. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage components 244, which can be utilized by mobile device 200 to store, among other things, applications 242 and/or other data. For example, data storage 244 may also be employed to store information that describes various capabilities of mobile device 200. The information may then be provided to another device based on any of a variety of events, including being sent as part of a header during a communication, sent upon request, or the like. Moreover, data storage 244 may also be employed to store a user's personal preferences, such as preferred colors, security parameters, audio preferences, or the like. Some personal preferences may relate to how pages or other information is received and displayed on the display 254. Data storage may also include data that is received from a web site or application and is passed back to the web site or application. This information may be referred to as a "cookie". An HTTP cookie is a cookie that mostly conforms to the HTTP protocol, though a cookie may be in alternate formats and conform to one or more of a variety of communication protocols. At least a portion of the data storage, including personal preferences and cookies may also be stored on a disk drive or other storage medium (not shown) within mobile device 200.

Applications 242 may include computer executable instructions which, when executed by mobile device 200, transmit, receive, and/or otherwise process messages (e.g., SMS, MMS, IM, email, and/or other messages), audio, video, text, and graphics, and enable telecommunication with another user of another client device. Applications 242 may include one or more browsers 245 and one or more email clients 246. Applications 242 may include one or more third-party clients 247, which may be provided by a vendor or software developer other than the client device manufacturer. Third party clients may be installed on the client device prior to, or subsequent to, delivery of the device to the user. Other examples of application programs include calendars, IM applications, SMS applications, VOIP applications, J2ME client applications, contact managers, task managers, transcoders, database programs, word processing programs, security applications, spreadsheet programs, games, search programs, and so forth.

Illustrative Server Environment

Figure 3:
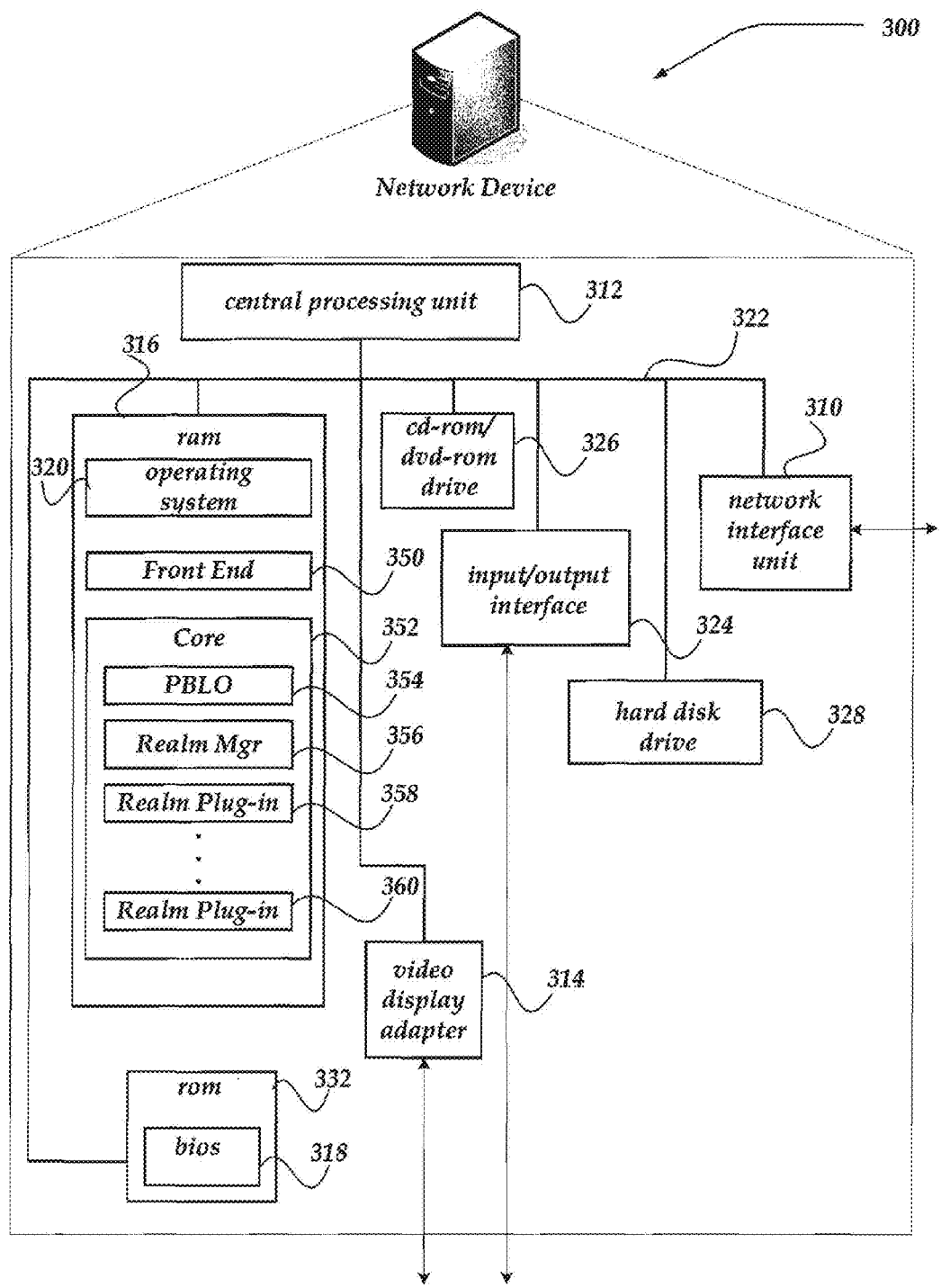
FIG. 3 shows one embodiment of a computing device that may be included in a system implementing the invention.

FIG. 3 shows one embodiment of a network application gateway 300, according to one embodiment of the invention. A network application gateway is a network device having capabilities of processing requests from client devices such as mobile devices 102-108 of FIG. 1. The embodiment of network application gateway illustrated in FIG. 3 may be used to implement the network application gateway 114 of FIG. 1. Network application gateway 300 may include many more components than those shown. It may also have less than all of those shown. The components shown, however, are sufficient to disclose an illustrative embodiment for practicing the invention.

Network application gateway 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network application gateway 300. Any general-purpose operating system may be employed. Basic input/output system ("BIOS") 318 is also provided for controlling the low-level operation of network application gateway 300. As illustrated in FIG. 3, network application gateway 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications are loaded into mass memory and run on operating system 320. As illustrated in FIG. 3, applications include a front end 350 and a core 352. The front end 350 and the core 352 may be considered to be separate applications or a single application. For ease of description, each is referred to herein as a component that may reside within network application gateway 300. As illustrated in FIG. 3, core component 352 includes additional components, such as a PBLO component 354, a realm manager 356, and a set of one or more realm plug-ins 358-360. Detailed descriptions of each of these components are provided in figures and text that follow. Examples of other application programs may include transcoders, schedulers, calendars, database programs, word processing programs, HTTP programs, customizable user interface programs, IPSec applications, encryption programs, security programs, VPN programs, SMS message servers, IM message servers, email servers, account management and so forth.

Network application gateway 300 is configured to receive, from a variety of client devices, requests for data or services. Network application gateway may perform front end processing of received requests. Front end processing may include security analysis, such as anti-spam operations or protection against denial-of-service attacks, and extraction of identifying information and other data. Network application gateway 300 may perform additional processing, including determining data needed to respond to a request, retrieving the determined data, and sending the request and associated data to a connector application. Network application gateway may receive and process responses returned by the connector application. Processing responses may include adding fields such as header, footer, and advertisements to a response page, and formatting responses and manipulating graphics based on knowledge of the requesting client device and its associated network gateway. Network application gateway 300 may also perform security analysis of responses, such as anti-spam operations, prior to sending a response to a client device. Network application gateway 300 may employ processes substantially similar to that described below in conjunction with FIGS. 4, 6, and 7.

Generalized Operation

Figure 4:
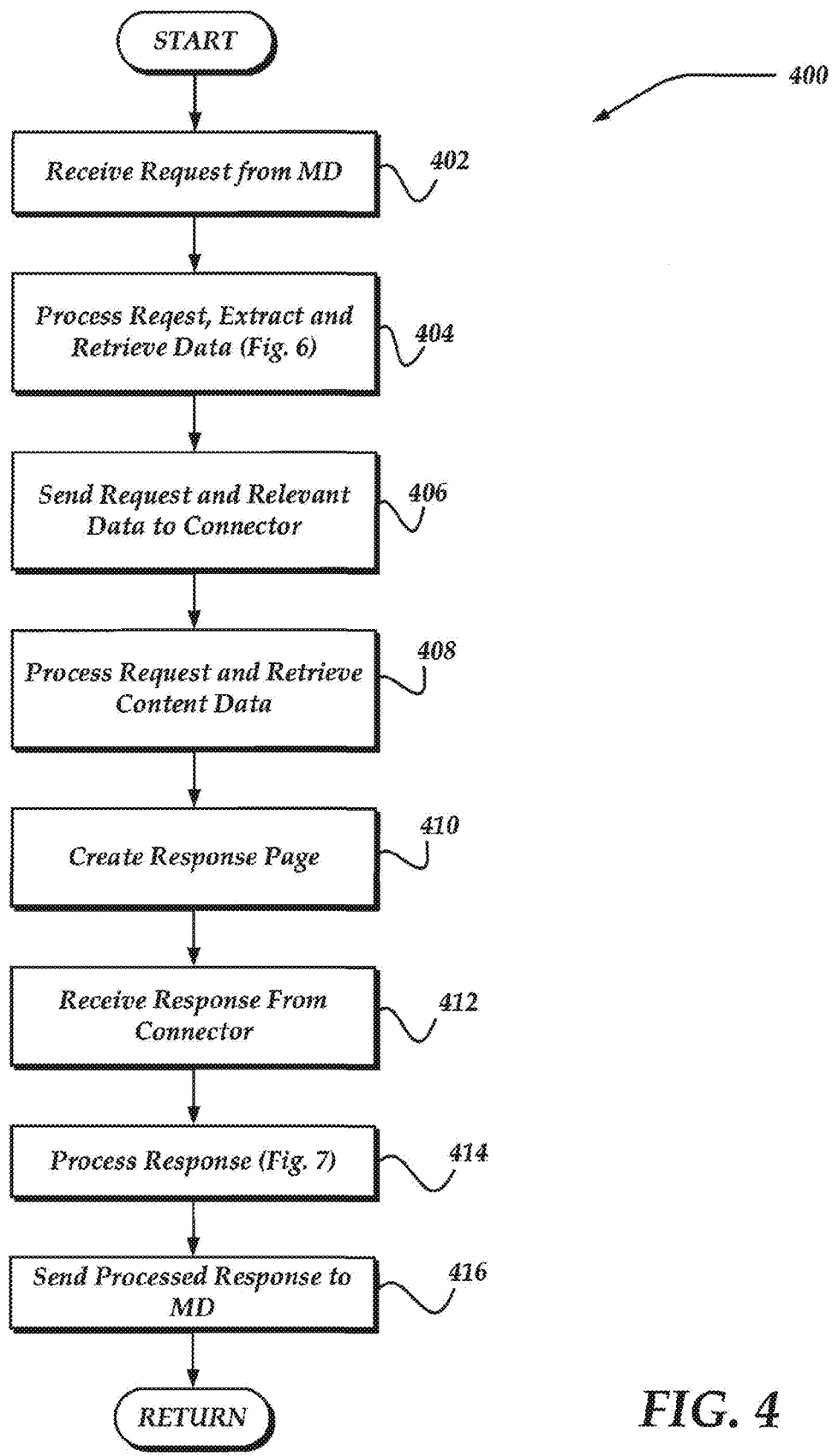
FIG. 4 is a logical flow diagram generally showing one embodiment of a process for processing requests from a client device.

FIG. 4 is a logical flow diagram generally showing one embodiment of a process for processing and responding to requests from client devices. Process 400 of FIG. 4 may be implemented within network application gateway 114 and connectors 116-120 of FIG. 1.

Process 400 begins, after a start block, at block 402, where a request is received from a client device, such as mobile devices 102-108 of FIG. 1. The request may have been processed and forwarded by one or more intermediate network devices, such as network gateways 110-112 prior to the receipt of the request. In accordance with one embodiment of the invention, the action of receiving the request 402 may be performed by network application gateway 114. A request and associated information may be contained within a message received by a network application gateway, or may span more than one message.

Process then flows to block 404, where the request is processed. Processing the request may include extracting information from the request, such as a URI or other network address. Extracted information may also include identifying information associated with the client device or a network gateway. Block 404 may also include the retrieval of relevant data from sources other than the request, such as data storage within the network application gateway, or data storage on other devices. It may also include the retrieval of relevant data that is not stored, such as data that is generated in response to a retrieval action. Relevant data may include data pertaining to the features, capabilities, and functionality of the client device. The actions of block 404 are discussed in further detail in FIG. 6 and associated text.

Process then flows to block 406, where the request and at least some of the associated data is sent to a connector application, such as one of connectors 116-120 of FIG. 1. This may employ any one or more of a number of communications mechanisms, as discussed herein, or other communication mechanisms.

Process then flows to block 408, where the request is processed and content data is retrieved. In one embodiment, at least a portion of this processing is performed by the connector application. Upon receiving a request, a connector application may communicate with, and receive information from a variety of sources. In particular, one or more web services 122-128 (FIG. 1) may be employed to perform actions, retrieve information, and the like. In one example, a connector application that is creating a web page may obtain news headlines, weather information, and stock prices from one or more web services, and include some of this information on the web page. A connector application may access data representative of a client device user's preferences, such as the particular stocks of interest, a home town, or types of desired news items. At least some of this information may be stored in a user database.

The connector application may insert advertisements, announcements, or other components in the response. An advertisement service, database, or other application may be employed to provide one or more of these components.

Process then flows to block 410, where a response to the request is generated. In one embodiment, the response generation action of block 410 is performed by the connector application. The action of block 410 may be performed by another connector application or network device that was forwarded the request or data representing the original request. It is to be understood that a device or application performing this action may employ other devices or applications to perform at least some of the response generation action. The type and form of the request may vary, and is related to the type of request, the nature of the connector application, and other factors. A response may include a page, or portion thereof, or multiple pages, which is intended to be displayed on a client device. A response may include an audio component, a video component, text, graphics, or any combination of these, or other types of responses related to the functionality of the client device.

It is to be understood that creation of a response page does not suggest that the created response is in its final form. It may be a preliminary version of a response page, which is then modified in one or more ways during the process of creating a final response page. Therefore, as used herein, a response or response page may refer to a preliminary response, an intermediate or final response, or a portion thereof.

The response generated by the connector may be considered to be a "generic" response, in that it is not tailored for at least some attributes of the requesting client device, and is not intended to be sent to the client device without modification based on these attributes. A generic response may, for example, be generated based on attributes of a virtual client device.

Upon the creation of a response page at block 410, the response is sent to the network application gateway. Process then flows to block 412, where the response is received by the network application gateway. The response may be received directly or indirectly from the connector, or from another device, application, or service that is employed in the process described herein.

Process then flows to block 414. At block 414, the response is processed in one or more ways to enhance the response. This processing may include adding a header, footer, or other components to a page, modifying formats, protocols, or languages of the response, modifying the response for a particular screen size, color capability, or other features of a client device. The network application gateway may insert advertisements in the response, or modify advertisements already inserted into the response. The network application gateway may perform security processing of the response or associated data. Further discussion of the action of block 414 is provided in FIG. 6 and associated text below.

Process then flows to block 416, where the response is sent to the client device. In one embodiment, the response is sent to the client device that sent the original request. In one embodiment the response is sent to one or more other client devices. For example, a first mobile device may send a request to send a message to a second mobile device. In this example, a request is received from the first mobile device and a response is sent to the second mobile device. A response may also be sent to the first mobile device, for example confirming that the message was sent to the second mobile device. This example may exist as a portion of a conversation between two or more mobile devices.

Figure 5:
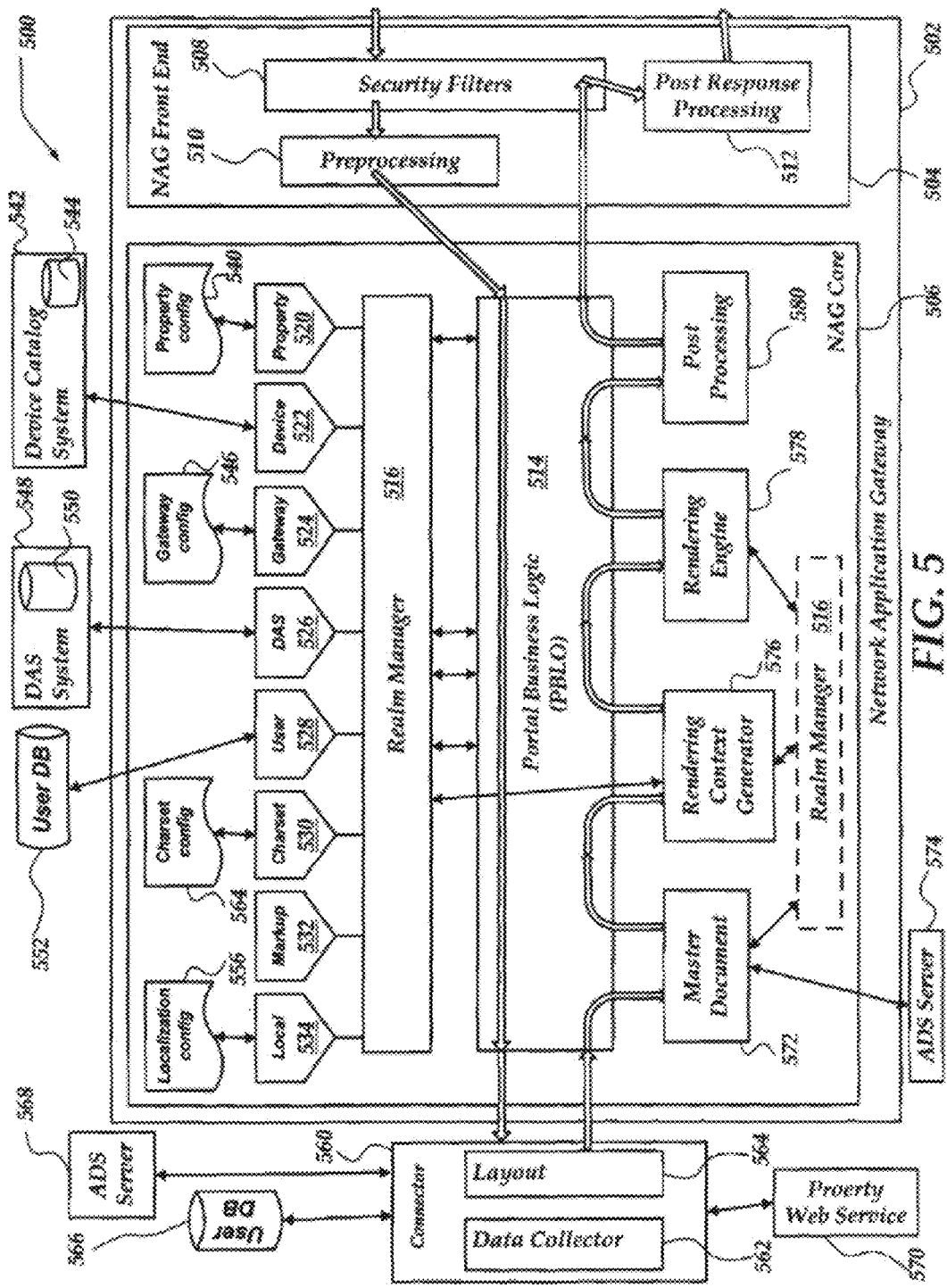
FIG. 5 is a system diagram of one embodiment of a system in which the invention may be practiced.

FIG. 5 illustrates one embodiment of a system 500 in which the invention may be practiced. The figure includes more detailed views of a network application gateway 502, which may be network application gateway 114 of FIG. 1, and a connector application 560, which may be one of the connectors 116-120 of FIG. 1, as well as additional associated components.

As illustrated in FIG. 5, one embodiment of a network application gateway (NAG) 502 includes an NAG front end 504 and an NAG core 506. The NAG front end 504 logically resides between the NAG core and client devices. The NAG front end 504 includes a security filter component 508, which performs operations to detect security risks, such as denial-of-service attacks, spam, viruses, hacking attempts, and the like. The security filter component may include one or more filters to perform its tasks. The security filter component 508 may operate on requests that come to the NAG front end from a client device as well as responses that come from connectors or are internally generated within the NAG 502.

The NAG front end 504 also includes a preprocessing component 510. The preprocessing component extracts data from the incoming request, including data that identifies the source of the request. The preprocessor may extract the MIN and the source IP address from the request. The MIN may be used to identify the client device. The IP address may be used to identify the network, such as one of network gateways 110-112 (FIG. 1). Since a network gateway is typically associated with a network carrier, identification of the network gateway typically identifies the carrier. Sprint, T-Mobile, and Cingular are examples of network carriers. A carrier may employ more than one gateway.

The illustrated NAG front end 504 also includes a post response processing component 512. This component may store data relating to the request and/or the response, the data being available for subsequent reporting or other activities.

The NAG core 506 illustrated in FIG. 5 includes a portal business logic (PBLO) component 514. In one embodiment, the PBLO has much of the business logic and is the primary manager of actions for handling a request and a response. The PBLO 514 interacts with and invokes a number of other components.

The realm manager 516, which resides within the NAG core in the illustrated embodiment, manages realms in the mobile domain. Each realm relates to an area of knowledge within the broader mobile domain. The realms relate to attributes of client devices, network gateways or carriers, client device users, and the like. Each realm includes a set of one or more parameters, described in more detail below.

In one embodiment of the invention, as illustrated by FIG. 5, each realm has a corresponding realm component that handles the parameters of its respective realm. In one embodiment, these realm components are implemented as plug-ins, providing an architecture that facilitates changes to the components and the addition of new components. The realm components may be structured in a different manner, and combined or distinguished in a number of ways. As discussed herein, the realm components are referred to as plug-ins, though alternate architectures may be used.

The realm manager 516 provides functionality for registering realm plug-ins, and for communicating with realm plug-ins. The realm manager also provides an interface to allow NAG components to retrieve data pertaining to each realm.

FIG. 5 illustrates a subset of realm plug-ins that may be employed with one embodiment of the invention. A description of the illustrated plug-ins, and their associated realms, follows. One or more additional plug-ins (not shown) may be used with the realm manager 516 in accordance with the present invention.

Property Realm. The property realm contains the definition of each connector. It has information relating to each connector application, including the various realm data or other data that a connector application may need to process a request. The property plug-in 520 manages the property realm data. A property configuration component 540 stores property realm configuration data, which may be configured by a connector or a developer of a connector. In one embodiment, configuration is performed by a registration process, in which a connector registers with the NAG 502. Registration information may include a connector address, list of URIs to be handled by the connector, and the data that is required by the connector. The PBLO 514 may communicate with the property plug-in 520 to determine at least some of the data that must be retrieved to process an incoming request, including data that must be sent to the connector.

The realm manager 516, together with the realm plug-ins 520-534 and the various stored data can be viewed as a dictionary of items and values. A connector may register the dictionary items that it needs to process a request. During request processing, the set of items associated with the connector and the request are determined by invoking the property plug-in 520, and the value corresponding to each dictionary item is obtained.

Device Realm. The device realm includes information relating to each client device, such as mobile devices 102-108 of FIG. 1. The device plug-in 522 manages the device realm. It communicates with and retrieves data from a device catalog system 542. The device catalog system may include specifications of each client device. These specifications may include screen size, number of lines that can be displayed, color capabilities of the device, image formats supported, markup languages supported, video capabilities, and the like. The device catalog system 542 may employ a device catalog database 544, to maintain device specification data.

Gateway Realm. The gateway realm includes information relating to each network gateway, such as network gateways 110-112 of FIG. 1. This information may include a list of IP addresses used by each network gateway, whether a network gateway supports cookies, whether a network gateway provides MIN numbers for mobile devices, and the like. The gateway plug-in 524 manages the gateway realm. It may be used, for example, for identifying a carrier from an incoming IP address. The gateway plug-in 524 may communicate with a gateway configuration component, which may store configurations of each gateway.

Localization Realm. The localization realm includes information that is used to localize responses. This may include data on geographical regions, languages, currencies, and the like. The localization plug-in 534 manages the localization realm. The localization plug-534 in may communicate with a localization configuration component 556, which may be used to store localization information.

Markup Realm. The markup realm includes information relating to markup languages to use when sending a response. A decision as to which markup language to use may be based on one or more of a number of factors, including the client device, the current request, the client application, the carrier, the geographic region, and the like. Though the device realm includes information relating to the markup language capabilities that a device may have, the markup plug-in 532 may use additional parameters, such as described above, to determine the markup language to use. Some, but not all, of the markup languages that may be used are WML, XHTML, HDML, XML, and HTML. This realm may also include information on scripting languages to use, such as WMLScript and JavaScript. The markup plug-in 532 manages the markup realm.

Device and Session (DAS) Realm. The DAS realm relates to session management. The DAS plug-in 526 manages the DAS realm. The DAS plug-in 526 may maintain continuity of a user session. For example, the DAS plug-in may maintain a sign-in status of a user. This is useful for mobile devices that do not support cookies. The DAS plug-in 526 may retain knowledge of an ongoing session, so that the session is recognized when making a request, after having previously signed in. The DAS plug-in may use a mobile devices MIN number or cookie to identify and maintain a session. In one embodiment, the DAS plug-in 526 may generate a unique identifier associated with a session, send the unique identifier in a URI returned to the mobile device, and use the identifier on a subsequent request to identify and maintain a session. The DAS plug-in 526 may communicate with a DAS system component 548, which stores DAS data in a DAS database 550.

In one embodiment, cookies may be stored in the DAS system 548. For example, a connector may send a cookie to a mobile device. The NAG 502 may recognize that the mobile device does not support cookies. The cookie is then sent to the DAS system for storage. The next time that a request comes in from the user or the mobile device, the DAS plug-in 526 may retrieve the appropriate cookie and send it with the request to the connector. It may appear to the connector that the cookie came from the mobile device. The DAS plug-in 526 may modify the cookie, prior to storing it or prior to sending it, as desired in order to facilitate operation of the system.

User Realm. The user realm relates to a user of a client device, for users that have an account. A user plug-in 528 maintains user information, such as user ID. A MIN number may be mapped to a user ID, such that, based on the MIN number, the user plug-in 528 can identify a user and access a user database and retrieve additional user information. Additional information may include, for example, information that the user entered or that was determined during a previous session from a device other than the currently used client device, such as a personal computer or another client device.

Character Set. The character set realm relates to character sets used by a client device. The charset plug-in 530 manages information relating to character sets, and retrieves the relevant data. The charset plug-in may employ a charset configuration component 554 to store and maintain character set information. Unicode is a commonly used standard character set, but some client devices do not use Unicode, or use variants of Unicode. The charset plug-in may determine the appropriate character set to use, and retrieve data related to the selected character set.

Upon retrieving the relevant realm data, the PBLO component 514 sends the client device request, along with at least a portion of the relevant realm data, to a connector 560. The relevant data sent to the connector 560 may include a cookie, session information, user information, or any of the various data that is retrieved by the realm manager 516. The connector may be one of the connectors 116-120 of FIG. 1.

As illustrated in the embodiment of FIG. 5, a connector 560 may include a data connector 562, which, based on the request, retrieves additional data. The data connector may communicate with one or more Web services, such as Web services 122-128 (FIG. 1) to retrieve data. Data may be returned from a web service in any one or combination of formats. XML is one standard format that may be used. One such Web service, a property web service 570, is illustrated in FIG. 5. The communication between the connector 560 and the web service 570 may include a cookie being passed to the web service or from the web service. The connector may receive a cookie from the NAG 502, forward the cookie to the web service 570, and receive a cookie back from the web service. The NAG 502, the connector 560, or the web service 570 may modify the cookie during this process.

The data collector 562 may also access various databases or servers to retrieve data. As illustrated in FIG. 5, in one embodiment, the connector 560 accesses a user database 566. The connector may retrieve data, modify or add new data related to the user, based on the received request. The connector 560 may also access an ADS server 568, which provides banner ads or other types of advertisements, to be included in the response.

The connector 560 may further include a layout component 564, which is used to generate and layout a response page based on retrieved data. The response page may be in any one or more formats, including various markup languages.

The connector 560 sends a response to the NAG 502, which is received by the PBLO component 514. The PBLO component directs processing by one or more components, which expand, modify, or otherwise enhance the response prior to sending it to the client device. Each of these components may communicate with the realm manager 516 as needed to obtain the data that has been retrieved or additional data that may be necessary and has not been retrieved. A discussion of some of these components now follows.

A master document component 572 may be used to combine additional fields to the response page received from the connector 560. The possible additional fields include, but are not limited to, one or more of a header field, a footer field, and advertisement fields. As illustrated in FIG. 5, the master document component 572 may communicate with an advertisement server 574 to retrieve one or more advertisements to be place on the response page.

A rendering context generator 576 uses at least some of the data retrieved by the realm manager 516 to generate a rendering context. The rendering context is a data structure that contains the various parameters and data needed to modify the response page for the specific client device that is to receive the response.

A rendering engine 578 uses the data from the rendering context to modify or enhance the response page for the client device. As previously discussed, modifying the response page may be based on one or more of a number of parameters, such as screen size, color capabilities, markup language, known bugs in a software or hardware version of the client device or network gateway, and the like. The rendering engine 578 may rewrite links or URIs within the response. For example, if the response includes a link to an image in one format, the post-processing component may modify the link to an alternate image in a different format, if the target client device is unable to display the first format. A link may also be rewritten to include a parameter, such as a value to identify a continuing session, so that a new request using the link will return the session identifier.

A post-processing component 580 may perform additional processing on the response page. This processing may include retrieving and embedding images that are in the response. For example, if a response page is in XML format, and includes a link to an image, the post-processing component 580 may retrieve the image and embed it within the XML page as base 64 encoded data or another format.

The NAG front end 504 illustrated in FIG. 5 includes a post response processing component 512. This component may perform actions such as logging data related to the request or the response. The logged data may subsequently be used for various reporting activities.

The response that is generated by various components and processes of the NAG 502 is sent to the target client device. This may be the client device that sent the initial request, or a different device.

Though the above discussion refers to the use of markup languages, the invention is not so limited. Client applications on a client device may send and accept data in a number of formats, including XML, binary XML, and others. The invention may be employed with these and other various data formats.

FIG. 5 and the above discussion illustrate that the present invention provides a way for a network application, such as connector 560, to implement business and application logic when responding to a request, and to layout a response page, while reducing or eliminating the tasks of tailoring a response to accommodate at least a portion of the client device attributes and capabilities. A connector may receive identical or similar requests from multiple client devices, and generate identical or similar responses to each request. The NAG 502 performs processing to enhance these responses for each client device based on each device's attributes, resulting in different response pages for each client device. The connector does not need to be aware of many of these differences or of the different enhancements that occur.

FIG. 5 and the above discussion also illustrate that the present invention provides a way for a network application, such as connector 560, to retrieve information for handling each request from different client devices. Though client devices may differ in the way then send information, or in their ability to even send some information, such as cookies or session IDs, the NAG 502 performs processing to retrieve, store, or generate information as necessary in order to send the information to the connector. The connector does not need to be aware of the different processing that may be required to retrieve and store the information.

Figure 6:
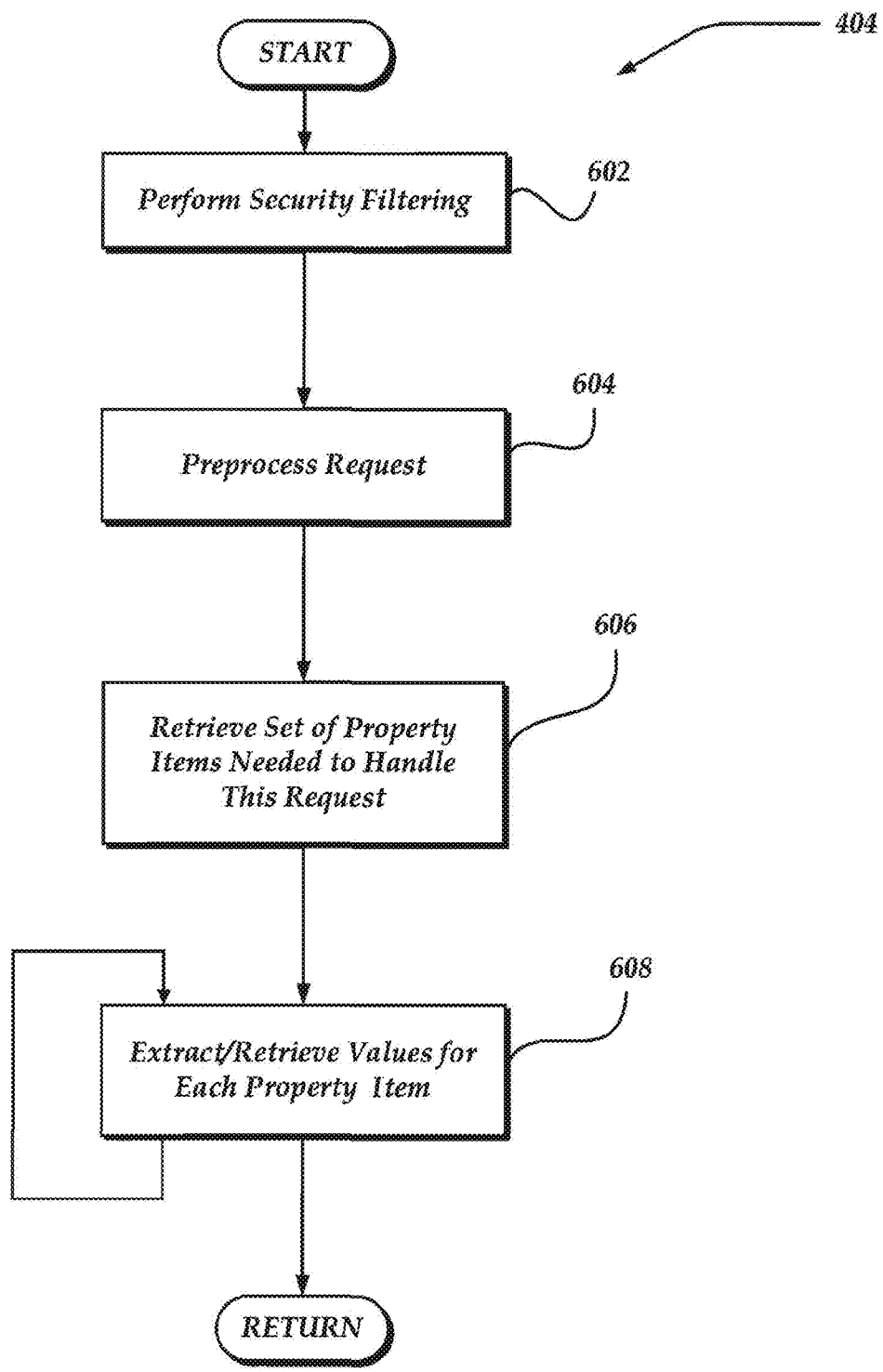
FIG. 6 is a logical flow diagram generally showing, in more detail, a portion of the process illustrated in FIG. 4.

FIG. 6 is a flow diagram illustrating, in further detail some of the actions of the process of FIG. 4. In particular, the process 404 of FIG. 6 may be performed as the actions of block 404 of FIG. 4, processing a request, extracting and retrieving data, in accordance with an embodiment of the present invention. The following discussion references elements of FIG. 5 as well as FIG. 6.

As illustrated, after a start block, at block 602, security filtering is performed on a received client device request. As previously discussed, this may be performed by security filters 508 in the NAG front end 504. Security filtering may include performing analysis to detect and screen out spam, denial-of-service attacks, viruses, or other security risks.

The process then flows to block 604, where the request is preprocessed. This may include extracting a MIN, IP address, or other data that identifies, or can be used to identify, the sending client device, the associated network gateway, or the associated carrier.

The process then flows to block 606, where a set of one or more property items needed to process the current request is retrieved. In one embodiment, the set of property items is selected from a greater set that the NAG advertises. This set of property items is used to control the retrieval of each of these items.

The process then flows to block 608, where each of the property items contained within the set of property items is retrieved from various data storage or from the request itself. This action is repeated until all of the specified item values are retrieved. The actions of block 608 may include communicating with various components that are part of the NAG or in communication with the NAG, including plug-ins, databases, configuration files, and the like. The action of block 404 of FIG. 4 completes, and the process flows to block 406 of FIG. 4, as discussed above.

Figure 7:
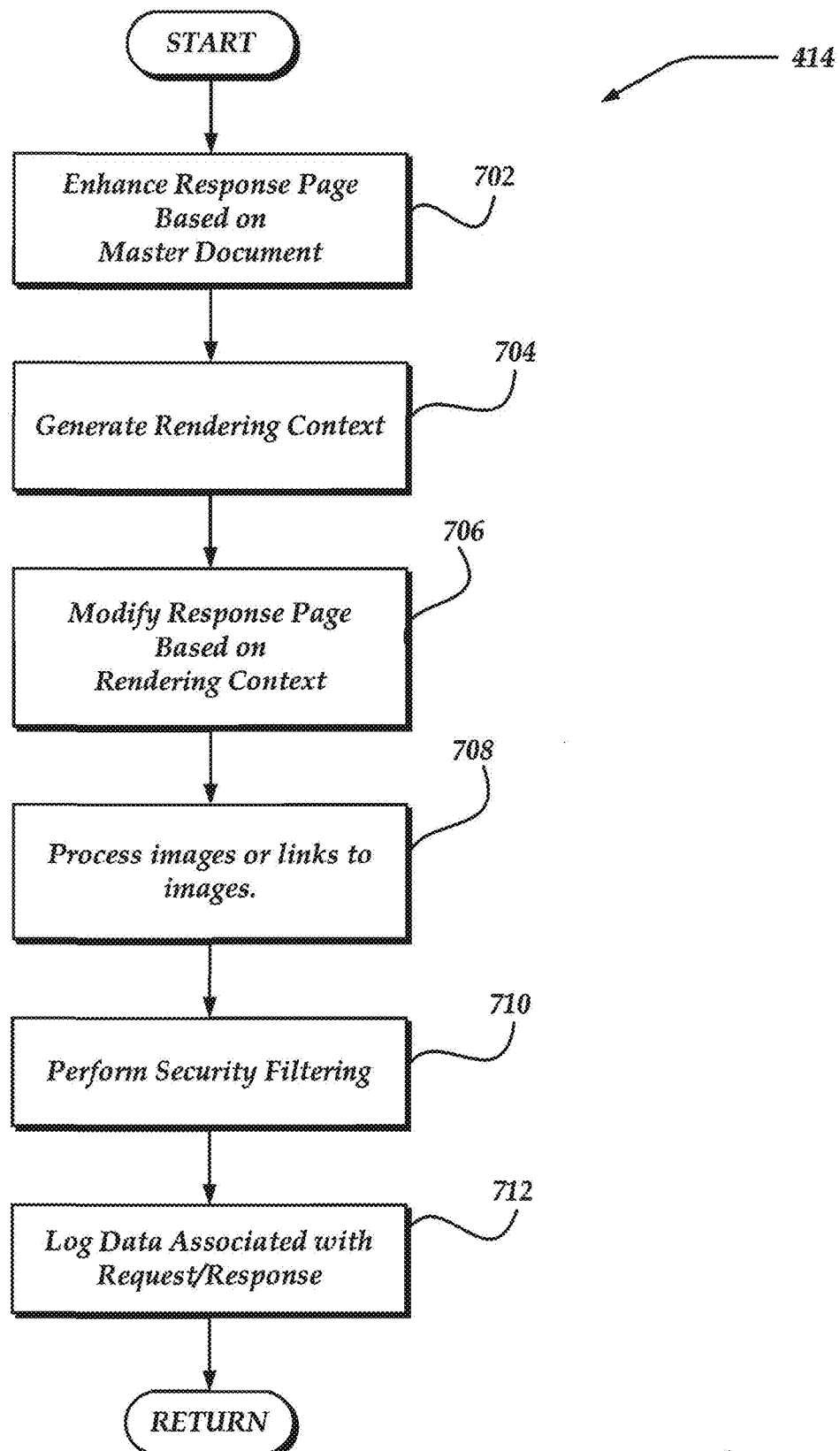
FIG. 7 is a logical flow diagram generally showing, in more detail, another portion of the process illustrated in FIG. 4.

FIG. 7 is a flow diagram illustrating, in further detail, some of the actions of the process of FIG. 4. In particular, the process 414 of FIG. 7 may be performed as the actions of block 414 of FIG. 4, processing a response, in accordance with an embodiment of the present invention. The following discussion references elements of FIG. 5 as well as FIG. 6.

As illustrated, after a start block, at block 702, the response page is enhanced based on a master document. This may include adding a header, adding a footer, adding one or more advertisements, or any combination of these. It is to be noted that the insertion of advertisements by the connector during the initial response generation and the insertion of advertisements by the NAG during the response page enhancement are discussed herein. One or more advertisements may be inserted by either component or by both components, in accordance with an embodiment of the invention. The selection of an advertisement to insert may be, but is not necessarily, based on different criteria by each component. The NAG may replace an advertisement inserted by the connector with a different advertisement.

The process then flows to block 702, where a rendering context is generated. The rendering context includes at least a portion of the various data retrieved during the processing of the request, as well as data extracted from the request.

The process then flows to block 706, where the response page is further modified, based on the data in the rendering context. These modifications prepare the page to be received and displayed by the client device. This action may take into account one or more attributes of the client device, such as screen size, color capabilities, markup languages, video capabilities, and the like. In one embodiment, any one or more of these modifications may be selectively performed, based on the attributes of the client device and the content of the response, so that if the received response already has a desired specification, such as a font size, image size, color, markup language and the like, a modification may not be needed.

The process then flows to block 708, where images or links to images are processed. Links to images may be modified to point to different images, having different formats, different color specifications, density, or sizes. Linked images may be embedded directly into the page.

The process then flows to block 710, where security filtering is performed on the response page. The process then flows to block 712, where logging of data related to the request or response is performed, in order to allow for subsequent reporting activities. The action of block 414 of FIG. 4 then completes, and the process flows to block 416 of FIG. 4, as discussed above.

Figure 8:
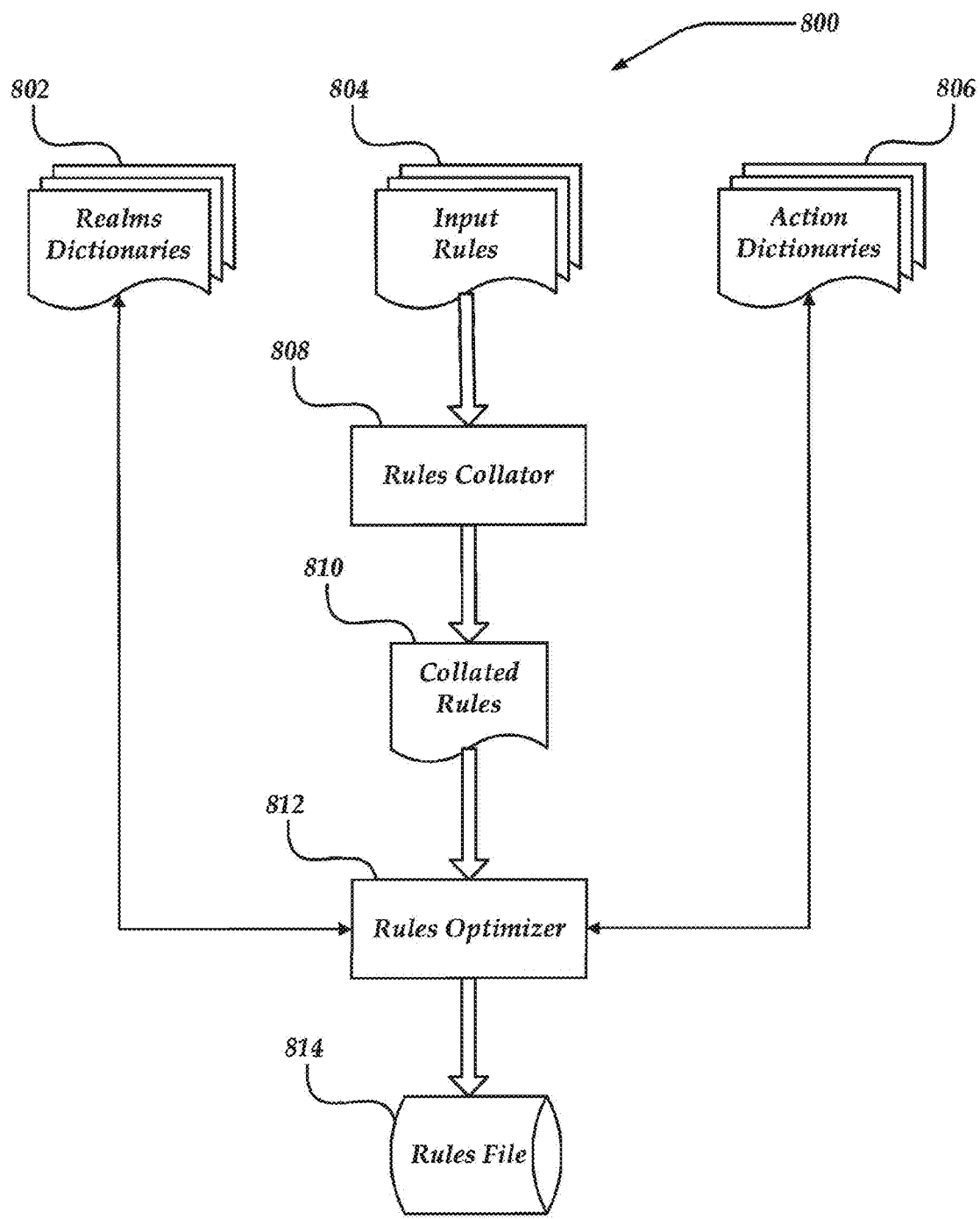
FIG. 8 shows a system for processing rule specifications in accordance with an embodiment of the invention.
Figure 9:
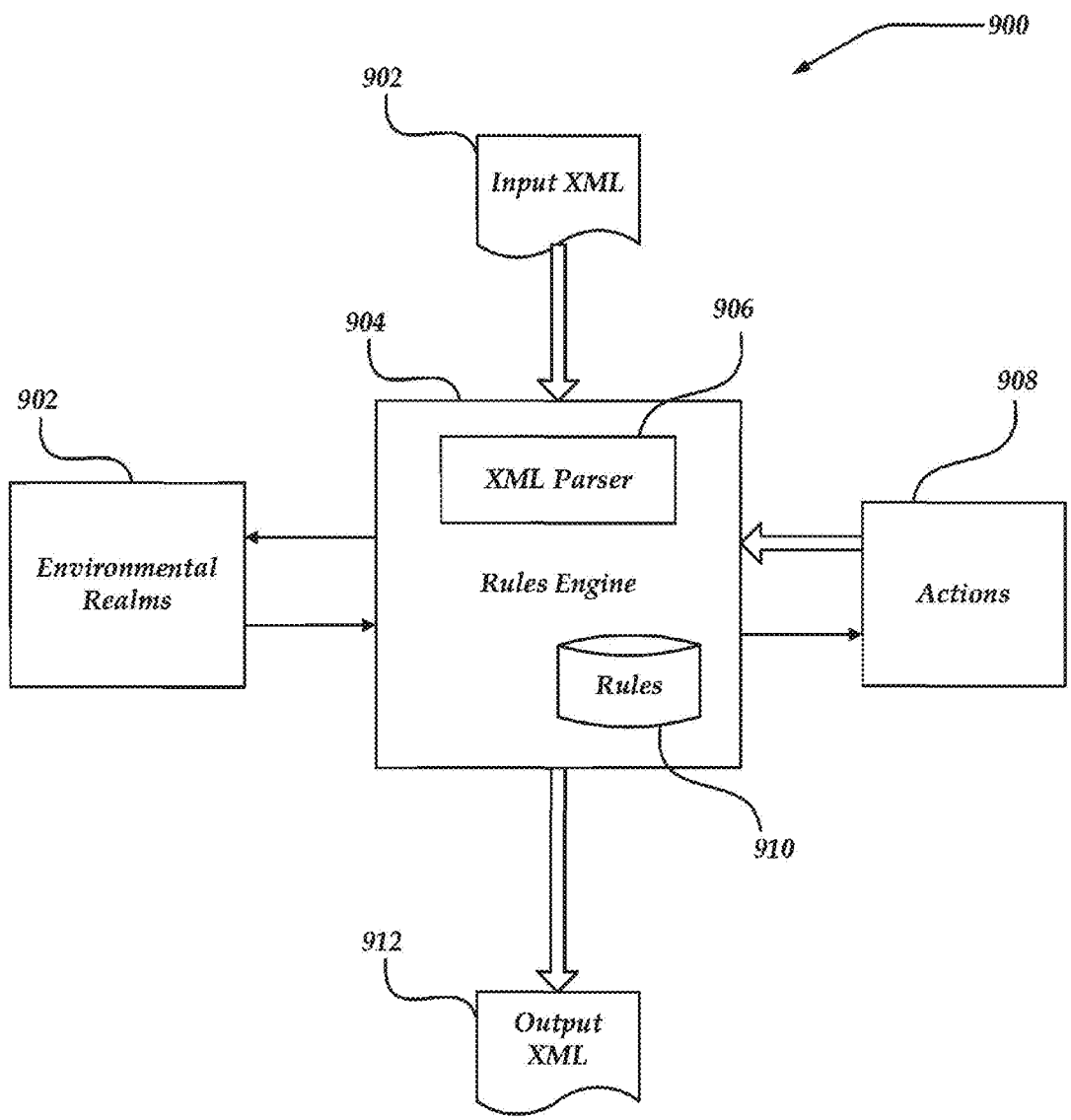
FIG. 9 shows a system for processing pages based on rules, in accordance with one embodiment of the invention.
Figure 10:
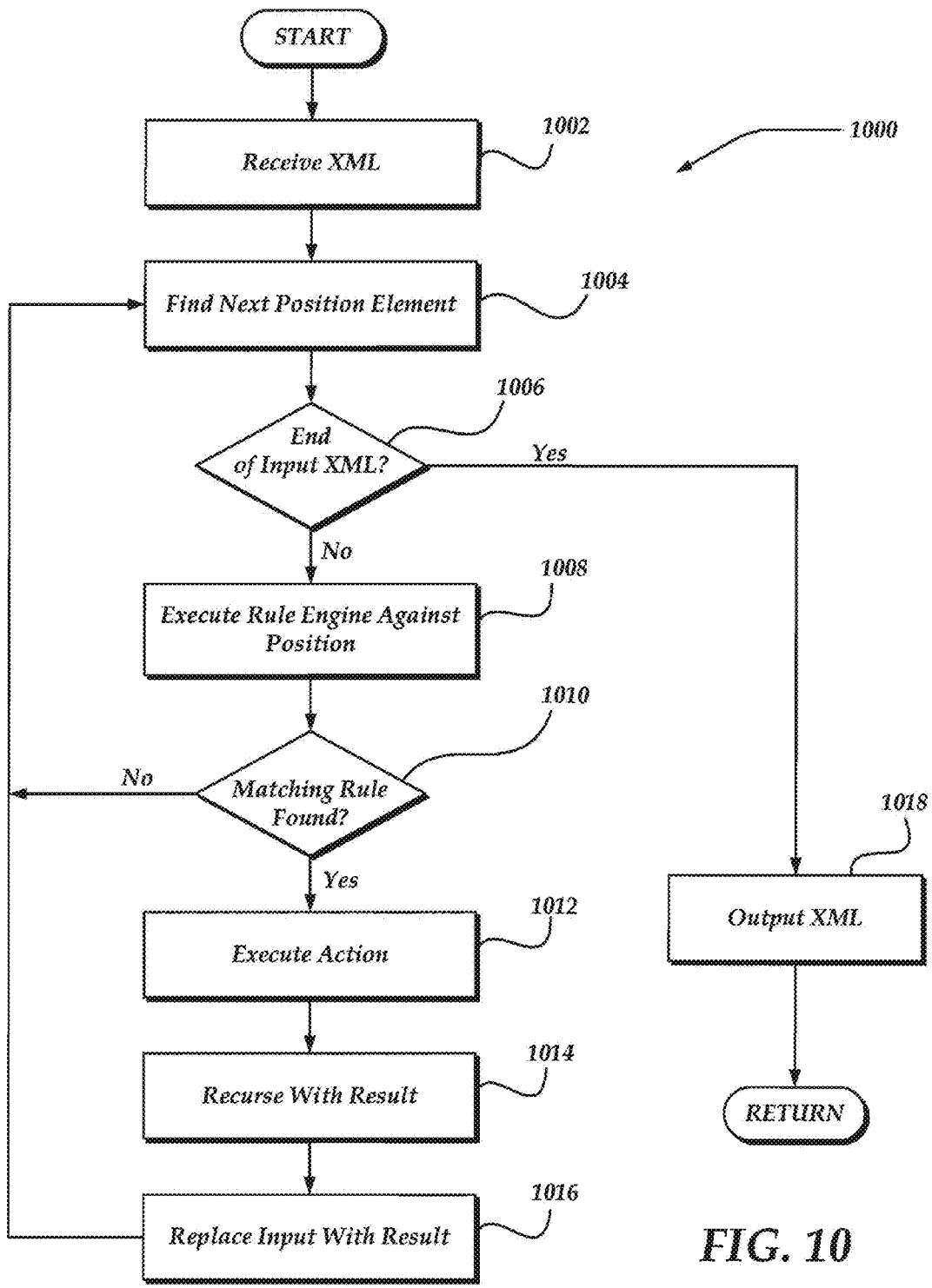
FIG. 10 is a logical flow diagram generally showing one embodiment of a process for processing pages based on rules, in accordance with one embodiment of the invention.

FIGS. 8-10 and associated text describe systems and methods that describe, in further detail, some aspects of the systems and methods described above, in accordance with one embodiment of the invention. More specifically, the systems and methods of FIGS. 8-10 may be included in the systems and methods described above, and may provide the functionality, or at least a portion thereof, of the master document 572 of FIG. 5.

FIG. 8 is a block diagram illustrating a system 800 for processing rule specifications in accordance with an embodiment of the invention. The system 800 may be employed off-line, rather than during the request processing of client requests described herein. The system includes one or more input rules 804. Input rules may exist as text in one or more files, as data structures in memory, or passed in to a process implementing the methods described herein. Input rules may be embedded within other text. In one embodiment, rules may exist as elements having a specified tag within XML, another markup language, or another format. They may be distributed in various locations, in one or more file systems, one or more storage media, or geographically distributed in one or more parts of the world. A rules collator 808 may extract or retrieve the relevant input rules 804, and collate them together to form a set of collated rules 810. A rules optimizer 812 may processes the collated rules 810. This processing may include validating each input rule, optimizing the rules, and compiling them to generate a rules file 814.

Each rule may have a corresponding test to be performed and an action that is performed if the test succeeds. The validation process may employ one or more realm dictionaries 802 and one or more action dictionaries 806. Realm dictionaries 802 and action dictionaries 806 may be provided by platform maintainers. A realm dictionary includes a description of the information that can be tested against. This may include tests of specifications or attributes of a user or client device to which the content is to be sent. For example, "latitude" and "longitude" may be used to test whether a client device's coordinates are within designated bounds. "Proximity" may be used to test whether a client device is within a designated distance to a location. "Time" or "date" may be used to test whether the current date or time or the most recent time that a user terminated a session is within a designated range. It may also include specifications or attributes of a carrier or network gateway associated with the client device. Information relating to various realms is illustrated in FIG. 5 and the associated discussion. Validating a rule may include verifying that a specified test is a valid test, and that required parameters are valid. An XML DTD or other specification may be used to validate specified tests.

An action dictionary 806 includes a description of the possible actions that a rule may specify. Replacing a string with a designated string, or appending a string with a designated string are examples of actions that may be specified. Modifying a formatting specification is another example of an action. Some actions may include "side effects," which are actions that may have effects other than modifying the input, such as changing an element in the environment. For example, an action may include changing the user's preferences in addition to producing a string result. There are a number of user preferences that can be changed, such as an email alert toggle, text size, and the like. A side effect action may send a message, such as an SMS message, or email, to a remote device, such as the user's client device or another remote device.

Validating each rule may include verifying that a specified action is a valid action, that required parameters are provided, and that parameters are valid. An XML DTD or other specification may be used to validate specified actions.

Optimizing the rules may include restructuring the designated elements of the collated rules. For example, if a rule test includes retrieving more than one realm data value, the rule may be organized so that the most costly retrieval occurs last, in order to reduce cost if the retrieval is not needed. Rules may also be structured in order that the highest priority rules are tested before lower priority rules. The rules optimizer generates a rules file 814 with the optimized rules.

The rules file 814 may be a single file in one or more of a number of formats or languages. In one embodiment, the processing produces a P-code representation of the tests and actions specified by the rules. P-code is a format that is designed for efficient processing by a run-time system. In one embodiment, the rules file may be a shared memory (SHM) file containing a position-independent representation of the rules. Other languages or formats may be used in accordance with the invention.

FIG. 9 is a block diagram illustrating a system 900 for processing rules in accordance with an embodiment of the invention. The illustrated system includes a rules engine 904 which includes logic for processing each rule, evaluating a test specified by the rule, and selectively performing an action specified by the rule, based on the outcome of the evaluation. The system processes input, such as a representation of a web page or other content to be sent to a client device, based on the rules. The system produces output, such as a transformed version of the input web page or content. The input and the output may be in one or more of a number of markup languages, other languages, or formats. In one embodiment, the input is in XML, and the output is in XML. Though the discussion herein refers to XML, the invention is not so limited.

The rules engine 904 may employ a parser, such as an XML parser 906, to parse the input XML. The parser may scan the XML input, locate relevant tags or elements, and return the elements to the rules engine 904. The rules engine may employ a rules store 910, which includes the rules that are to be processed by the rules engine. The rules store may include one or more files in a memory or data store. The rules store may include a representation of the rules file 814 of FIG. 8, which has been generated as a result of performing the offline processing described in FIG. 8 and associated text. As rules engine 904 scans the input XML 902, retrieving relevant elements, it triggers the execution of rules from the rules store 910. Upon finding a successful rule match, the action specified by the rule is performed. This process is described in further detail below.

The system 904 includes an environmental realms component 902 and an actions component 908. The environmental realms component 902 may include environmental information that the rule tests can be performed against and program logic for retrieving the information. Each environmental realm 902 relates to a realm of information. A realm includes one or more functions that can be used to query the realm. For example, a device realm may pertain to specifications of client devices. The device realm may include functions that retrieve a specification of the client device that is to receive the page or other content. There may be functions that retrieve a client device screen size, color capabilities, or the like. A markup realm may have a function that retrieves a markup language supported by the client device. A carrier realm may have a function that retrieves the network carrier associated with the client device. When the rules engine executes a rule test, it may call these functions as needed to retrieve environmental realm data.

The system 904 includes an actions component 908. The actions component 908 includes a function for performing each action that can be specified in a rule. The action component 908 corresponds to the action dictionaries 806 of FIG. 8. Generally, each action in the action dictionaries 806 may have a corresponding action function in the actions component 908.

When the rules engine 904 performs a test specified by a rule, if the test results in a match, the action function corresponding to the action element of the rule is invoked. An example of an action is the output of a string, which results in insertion of the string in a designated location on a page. The action function corresponding to this action retrieves the designated string and inserts it at the proper location in the XML stream.

In one embodiment, rules engine 904 may be included in network application gateway 502 of FIG. 5 and employed by the PBLO 514 to process response pages. In one embodiment, rules engine may be included in master document 572 of FIG. 5, and perform at least a portion of the actions of master document 572 described above. In one embodiment, rules engine 904 communicates with network application gateway 502 and facilitates the actions of processing response pages. In one embodiment, the functions of the environmental realms component 902, or a portion thereof, are included in the PBLO 514. The rules engine 904 may invoke the realms manager 516 to retrieve realm data. In one embodiment, the system 900 may be integrated with the system 500 (FIG. 5), and the processes of each integrated. In one embodiment, the system 900 is employed independently of the system 500 to process input streams or data, and perform the processes described herein.

Prior to a discussion of FIG. 10, a discussion of some of the terms used herein, and an example syntax follows. The syntax may be used in one embodiment, and is provide herein to illustrate certain concepts. However, the invention is not limited to the illustrative syntax.

A page may include zero, one, or more "elements". An element is a string having a beginning and an end. In XML, an element is delimited by begin and ending tags. Elements can be nested, so that an element may contain a number of elements. A "position" element is an element that may correspond to a position on a page. Header, footer, and body are examples of positions on a page. Nested position elements create a tree structure, where the inner position elements are more precise than the outer position element containing it. Nested position elements may be referred to as a sequence of position names, with the leftmost position having the least precision. For example, "header.promo" refers to a promo position element within a header position element.

A rule has a test component and an action component. The term "evaluating" a rule and "evaluating" a test of a rule each refer to performing at least a part of the test to determine if there is a match. A "matching rule" refers to a rule that has been evaluated and resulted in a match. Each rule corresponds to a position. When a position is identified in the input page, rules corresponding to the position may be evaluated. If more than one rule corresponding to a position exists, the rules are evaluated in priority order. In one embodiment, if a matching rule is found, the remaining rules corresponding to the position are not evaluated. The use of priorities allows a higher priority rule to override a lower priority rule, such that the lower priority rule is not evaluated if the higher priority rule matches. Rule priorities may be used, for example, to allow a rule to match during a limited time period, or based on other realm information.

In one embodiment, priority of rules may be determined by one or more of three factors. A rule may explicitly specify its priority, for example, as a numeric value. This factor is first used to distinguish priority. Rules that specify the same priority are then prioritized based on how specific the rule's test is. A rule having more terms in its test is given a higher priority than a rule having fewer terms. If two or more rules are not distinguished by these two factors, the third factor is cost. Rules having a lower cost have a higher priority than rules having a lower priority. Cost may be considered in time to evaluate, monetarily, or use of resources.

FIG. 10 is a flow diagram illustrating a process 1000 for processing pages or other content, based on rules, in accordance with one embodiment of the invention. In one embodiment, process 1000 may be performed within the block 702 of FIG. 7.

After a start block, at block 1002, XML input is received. As stated above, the input can be in a variety of formats, and the invention is not limited to XML or any other format, though the term XML is used to simplify this discussion. Process flow then proceeds to block 1004, where the XML is scanned until the first, or next, position element on the page is found. The position element may be one of a number of position components that may appear on a page. These include header, footer, body, navigation bar, and the like.

Process flow then proceeds to a decision block 1006, where a determination is made of whether a position element has been found, or the end of the page has been reached. If a position element is found, process flow proceeds to block 1008, where the rule engine is executed against the position element.

The action of block 1008 may include testing one or more rules. In one embodiment, if there are more than one rules corresponding to a position element, they are selectively evaluated in order of priority, until either a match is found or each of the rules has been evaluated. In either case, process flow proceeds to decision block 1010. In the embodiment illustrated in FIG. 9, evaluation of a rule's test may be performed by invoking the environmental realms component 902.

At decision block 1010, a determination is made of whether a matching rule corresponding to the element has been found. If a matching rule has not been found, the process loops back to block 1004, to find the next position element. If a matching rule has been found, the process flows to block 1012.

At block 1012, the action specified in the matching rule is executed. In the embodiment illustrated in FIG. 9, this action may be performed by the actions component 908. An action may have a resulting string, such as an XML string or other type of string. An action may include retrieving a string from a specified file. Another action may include sending a request to a remote server, where the result is a string returned by the remote server. Yet another action may include sending a request to a remote server, processing the returned string through a filter, where the processed string is the result.

Process then flows to block 1014, where the process 1000 may be called recursively, passing to it the result of the action executed at block 1012. This allows an action to retrieve a string with one or more position elements, each of which triggers one or more rules to be tested, possibly resulting in additional actions.

Process then flows to block 1016. At block 1016, the result from the previous blocks is inserted into the input at the current position. For example, if the current position is the header, a string may be inserted in the header element of a page.

Process then flows back to block 1004, where the loop beginning at block 1004 begins again. The loop may terminate when the determination block 1006 determines that the end of the XML has been reached, and there are no remaining position elements. Process flow then proceeds to block 1018, where the resulting XML is output.

In one embodiment, the XML parser 906 and rules store 910 are component of the rules engine, though the invention is not so limited, and either one or both may reside on one or more other network devices that are in communication with rules engine 904.

In one embodiment, more than one instance of a rule engine may be employed, on the same or on different devices. A network application or other application providing content may employ an instance of a rule engine to manage content pertaining to the application, a web product, or a portion thereof. In one embodiment, the resulting page from an application employing an instance of a rule engine may be further processed by another instance of a rule engine, having another set of rules.

EXAMPLE

In order to illustrate a portion of the capabilities that the system and methods of the invention provide, following are some examples of actions that may be performed and criteria that may be used to select actions, using the system and methods described herein.

Selectively displaying a logo, text, header, footer, or other component based on the identity of a network carrier associated with a client device.

Selectively displaying an advertisement based on the current date, the location of the client device, and one or more characteristics of the user.

Determining a mechanism to send information to a client device, based on the client device location, a time of day, client device capabilities, and a user's preferences. The mechanisms may include sending a web page, an SMS message, an email, or other delivery mechanisms.

It will be understood that each block of the flowchart illustrations of FIGS. 4, 6, 7, and 10, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustrations may also be performed concurrently with other blocks or combinations of blocks, or even in a different sequence than illustrated without departing from the scope or spirit of the invention.

Accordingly, blocks of the flowchart illustrations support combinations of means for performing the specified actions, combinations of steps for performing the specified actions and program instruction means for performing the specified actions. It will also be understood that each block of the flowchart illustrations, and combinations of blocks in the flowchart illustrations, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A computing device comprising:
   a processor;
   a non-transitory computer-readable storage medium for tangibly storing thereon program logic for execution by the processor, the program logic comprising:
      receiving logic executed by the processor for receiving, over an electronic communications network, a client request for a response to be transmitted to a client computing device over the electronic communications network;
      determining logic executed by the processor for determining a location of the client computing device, the determined location being used in at least one of a request for data to be retrieved from a network application and in making at least one modification to the response received from the network application;
      requesting logic executed by the processor for requesting, from the network application and using a network application request, the data for responding to the received client request, the network application request comprising a request for the network application to retrieve data from a number of web services in accordance with user preferences;
      receiving logic executed by the processor for receiving the response from the network application, the network application's response comprising the requested data in a common presentation used by the network application for each request received by the network application;
      enhancing logic executed by the processor for enhancing the response received from the network application, the enhancing comprising generating an enhanced response specifically for use by the client computing device, the generating using the response received from the network application;
      transmitting logic executed by the processor for transmitting the enhanced response to the client computing device over the electronic communications network in response to the client request, the transmitting causing the enhanced response to be displayed on a display at the client computing device.

2. The computing device of claim 1, the enhancing logic further comprising:
   changing logic executed by the processor for changing a first link contained in the common presentation to a second link, the first link for use in accessing a first content item and the second link for accessing a second content item other than the first content item, the modifying causing the client computing device to access the second content item instead of the first content item.

3. The computing device of claim 1, the enhancing logic further comprising:
   modifying logic executed by the processor for modifying the common presentation to include content selected based on the determined location of the client computing device.

4. The computing device of claim 1, further comprising:
   determining logic executed by the processor for determining a client application of the client computing device to receive the enhanced response; and
   the enhancing logic further comprising generating logic executed by the processor for generating the enhanced response for use by the client application.

5. The computing device of claim 4, the client application is one of an electronic mail client application, instant messaging client, browser application and social networking client application.

6. The computing device of claim 1, the client computing device to which the enhanced response is transmitted is a first client computing device different from a second client computing device from which the client request is received, the client request comprising information for use in identifying the first client computing device.

7. The computing device of claim 1, further comprising:
accessing logic executed by the processor for accessing a property realm data store to identify the network application to direct a request for the data for responding to the received client request.

8. The computing device of claim 1, further comprising:
accessing logic executed by the processor for accessing a device realm data store to retrieve at least one device-specific capability to be used in generating, using the response received from the network application, the enhanced response specifically for use by the client computing device.

9. The computing device of claim 1, further comprising:
managing logic executed by the processor for managing session information for use in managing a user's session with the network application;
the requesting logic further comprising transmitting the session information to the network application with a request for the data for responding to the received client request.

10. The computing device of claim 1:
the receiving logic executed by the processor for receiving the response from the network application comprising receiving the network application's response in a web page comprising the requested data and having the common presentation used by the network application for each request received by the network application, the web page comprising a plurality of page elements;
the enhancing logic executed by the processor for enhancing the response received from the network application further comprising making a determination, for each page element of the plurality, whether or not to modify the page element in generating the enhanced response specifically for use by the client computing device.

11. A method comprising:
receiving, over an electronic communications network, a client request for a response to be transmitted to a client computing device over the electronic communications network;
determining a location of the client computing device, the determined location being used in at least one of a request for data to be retrieved from a network application and in making at least one modification to the response received from the network application;
requesting, from the network application and using a network application request, the data for responding to the received client request, the network application request comprising a request for the network application to retrieve data from a number of web services in accordance with user preferences;
receiving the response from the network application, the network application's response comprising the requested data in a common presentation used by the network application for each request received by the network application;
enhancing the response received from the network application, the enhancing comprising generating an enhanced response specifically for use by the client computing device, the generating using the response received from the network application;
transmitting the enhanced response to the client computing device over the electronic communications network in response to the client request, the transmitting causing the enhanced response to be displayed on a display at the client computing device.

12. The method of claim 11, the enhancing further comprising:
changing a first link contained in the common presentation to a second link, the first link for use in accessing a first content item and the second link for accessing a second content item other than the first content item, the modifying causing the client computing device to access the second content item instead of the first content item.

13. The method of claim 11, the enhancing further comprising:
modifying the common presentation to include content selected based on the determined location of the client computing device.

14. The method of claim 11, further comprising:
determining a client application of the client computing device to receive the enhanced response; and
the enhancing further comprising generating the enhanced response for use by the client application.

15. The method of claim 14, the client application is one of an electronic mail client application, instant messaging client, browser application and social networking client application.

16. The method of claim 11, further comprising:
accessing a device realm data store to retrieve at least one device-specific capability to be used in generating, using the response received from the network application, the enhanced response specifically for use by the client computing device.

17. The method of claim 11, further comprising:
managing session information for use in managing a user's session with the network application;
the requesting further comprising transmitting the session information to the network application with a request for the data for responding to the received client request.

18. A non-transitory computer-readable storage medium tangibly encoded with computer-executable instructions, that when executed by a processor associated with a computing device, performs a method comprising:
receiving, over an electronic communications network, a client request for a response to be transmitted to a client computing device over the electronic communications network;
determining a location of the client computing device, the determined location being used in at least one of a request for data to be retrieved from a network application and in making at least one modification to the response received from the network application;
requesting, from the network application and using a network application request, the data for responding to the received client request, the network application request comprising a request for the network application to retrieve data from a number of web services in accordance with user preferences;
receiving the response from the network application, the network application's response comprising the requested data in a common presentation used by the network application for each request received by the network application;
enhancing the response received from the network application, the enhancing comprising generating an enhanced response specifically for use by the client computing device, the generating using the response received from the network application;

transmitting logic executed by the processor for transmitting the enhanced response to the client computing device over the electronic communications network in response to the client request, the transmitting causing the enhanced response to be displayed on a display at the client computing device.

\* \* \* \* \*